(12) United States Patent
Ozaki

(10) Patent No.: US 8,190,029 B2
(45) Date of Patent: May 29, 2012

(54) BANDWIDTH ALLOCATION METHOD, OPTICAL LINE TERMINATOR, OPTICAL NETWORK UNIT, COMMUNICATION SYSTEM, AND RECORDING MEDIUM RECORDING PROGRAM OF DEVICE

(75) Inventor: Hirokazu Ozaki, Tokyo (JP)

(73) Assignee: NEC Corporation, Tokyo (JP)

( * ) Notice: Subject to any disclaimer, the term of this patent is extended or adjusted under 35 U.S.C. 154(b) by 638 days.

(21) Appl. No.: 12/389,672

(22) Filed: Feb. 20, 2009

(65) Prior Publication Data

US 2009/0214209 A1     Aug. 27, 2009

(30) Foreign Application Priority Data

Feb. 22, 2008     (JP) ................. 2008-041016

(51) Int. Cl.
*H04J 14/08* (2006.01)
(52) U.S. Cl. .................... 398/99; 398/100
(58) Field of Classification Search ........... 398/99–100
See application file for complete search history.

(56) References Cited

U.S. PATENT DOCUMENTS 7,362,704 B2 * 4/2008 Sisto et al. ............. 370/230

FOREIGN PATENT DOCUMENTS

CN     1601982 A     3/2005
JP     2000358041 A     12/2000

OTHER PUBLICATIONS

A. Hadjiantonis et al., "A Novel Decentralized Ethernet-Based Passive Optical Network Architecture", IEEE, 2004.*
A. Hossain et al., "A Distributed Control Plane Architecture for EPON: Simulation Study and Feasibility experiment", The Second International Conference on Innovations in Information Technology, 2005.*
S. Sherif et al., "A Novel Decentralized Ethernet-Based PON Access Architecture for Provisioning Differentiated QoS", Journal of Lightwave Technology, vol. 22, No. 11, Nov. 2004.*
Y. Luo et al., "Bandwidth Allocation for Multiservice Access on EPONs", IEEE Optical Communications, Feb. 2005, S16-S21.
Chinese Office Action for CN200910118109.4 issued Oct. 9, 2011.

* cited by examiner

*Primary Examiner* — Shi K Li

(57) ABSTRACT

An object of the present invention is to increase the bandwidth use efficiency without requiring costly and fast integrated circuits or CPUs in the control unit even in a large-scale system with a large number of ONUs. An optical network unit includes an allocating unit that determines bandwidth allocation based on a predetermined allocation condition and a bandwidth transmitting unit that transmits bandwidth allocation information determined by the allocating unit to an optical line terminator. The optical line terminator is connected to a plurality of optical network units and includes a pipeline transmitting unit that transmits bandwidth allocation information transmitted from the optical network units to all optical network units to be allocated with bandwidth.

6 Claims, 15 Drawing Sheets

US 8,190,029 B2

BANDWIDTH ALLOCATION METHOD, OPTICAL LINE TERMINATOR, OPTICAL NETWORK UNIT, COMMUNICATION SYSTEM, AND RECORDING MEDIUM RECORDING PROGRAM OF DEVICE

This application is based upon and claims the benefit of priority from Japanese patent application No. 2008-041016, filed on Feb. 22, 2008, the disclosure of which is incorporated herein in its entirety by reference.

BACKGROUND OF THE INVENTION

1. Field of the Invention

The present invention relates to a bandwidth allocation method, an optical line terminator, an optical network unit, a communication system, and a recording medium recording a program of a device in a system, such as Passive Optical Network (hereinafter "PON"), in which the optical line terminator and the optical network unit are connected.

2. Description of Related Art

In recent years, the broadband of access lines has progressed as a result of the rapid spread of the Internet. Examples of broadband access lines in practical use include various systems such as ADSL (Asymmetric Digital Subscriber Line) and cable modems. The PON is considered a strong potential worldwide for wider bandwidth.

FIGS. 1 and 2 depict a general configuration of the PON. ONUs (optical network unit) are installed in end users' houses, and an OLT (optical line terminator) is installed at a station. The ONUs and OLT are connected by optical fibers and an optical splitter. The personal computers of the users are connected to the network through the ONUs and further connected to superior networks and the Internet through the OLT.

As uplink signals (wavelength is usually 1.3 μm) and downlink signals (wavelength is usually 1.5 μm) are wavelength-multiplexed, the devices are connected by an interactive single-core optical fibers. The downlink signals are broadcasted from the OLT to all ONUs, and each ONU checks the address of the frame and imports the frame addressed to the ONU.

The uplink signals from the ONUs merge at the optical splitter, and time-division multiplexing is used to avoid collision of the signals. Therefore, the OLT adjusts output requests (REPORT) momentarily reported from the ONUs and provides signal transmission permissions (GATE) to the ONUs after calculating the transmission time based on the distances between the OLT and the ONUs.

The output request (REPORT) includes information of queue status (length of queue) of buffers. The signal transmission permission (GATE) includes transmission start time and transmission duration time for each priority of signals, and the ONUs transmit the uplink signals according to the times. Thus, the uplink bandwidth allocation is realized by allocation of time slots.

FIGS. 1 and 2 depict flows of signals in which three ONUs are connected. FIG. 1 depicts downlink signals, while FIG. 2 depicts uplink signals. Numbers 1 to 3 with rectangles denote frames of ONU-addressed signals and ONU-departed signals.

FIG. 3 depicts a time relationship of an output request signal (REPORT), an output enable signal (GATE), and an uplink data signal (DATA) exchanged between the ONU and the OLT. FIG. 3 depicts a signal exchanged between one ONU and one OLT. In FIG. 3, t1 and t5 denote transmission time of REPORT, t2 and t4 denote arrival time of GATE, Waiting Time denotes waiting time until signal transmission, and Time Slot denotes a time slot of data transmission.

In many cases, REPORT is transmitted at the end of DATA by piggy back. In that case, t4=t5.

FIG. 4 depicts a time relationship of signals exchanged between three ONUs (ONU1, ONU2, and ONU3) and the OLT. A cycle in which uplink signal transmissions of all ONUs are performed will be called a service cycle. The length of the service cycle is usually not constant and is often dynamically changed according to the output requests from the ONUs.

Ethernet (registered trademark) and PON are standardized by IEEE802.3ah, wherein frame formats of a REPORT message and a GATE message are defined. However, uplink bandwidth allocation methods or algorithms are not defined and are left up to the installation of devices.

Since the uplink signals usually include a plurality of services, traffic is classified, and each class is provided with a priority. For example, three classes, EF (Expedited Forwarding), AF (Assured Forwarding), and BE (Best Effort), are defined in DiffServe (Differentiated Services) standardized by IETF (Internet Engineering Task Force).

EF is a class that guarantees delay and bandwidth, AF is a class that only guarantees bandwidth without guaranteeing delay, and BE is a class that neither guarantees delay nor bandwidth. Their representative applications include VoIP (Voice over IP), file transfer, and normal Internet access, respectively.

An example of a related technology of the bandwidth allocation method includes an algorithm called D1 (see Non-Patent Document 1 (Y. Luo et al., "Bandwidth Allocation for Multiservice Access on EPONs", IEEE Communications Magazine February 2005, s16-s21)). In the algorithm D1, a maximum value of a service cycle is determined in advance, and fixed bandwidth is allocated to the EF of each ONU within the value. The AF is then allocated based on the REPORTs from the ONUs. At this time, allocation according to the request is performed if the sum of the requests of the AF is less than the remaining bandwidth. BE is allocated according to the request if the bandwidth still remains. The AF is equally allocated to the ONUs if the sum of the requests of the AF exceeds the remaining bandwidth. The BE is not allocated. The calculation and allocation of bandwidth are performed at once after the REPORTs from all ONUs are notified, and GATE is transmitted to each ONU.

FIG. 5 is a block diagram of an allocation module arranged in the OLT of the related technique. IF in FIG. 5 denotes an interface of REPORT and GATE messages exchanged with the ONUs. AM denotes an allocation module, which receives notification of the status of buffer memories of the ONUs from the IF to perform actual bandwidth allocation.

A related technique by the present applicant includes a technique in which a subscriber terminal transmits a warning when the capacity of data to be transmitted is greater than a predetermined threshold and when the capacity is zero, and an optical line terminator changes the maximum number of cells, the average number of cells, and the minimum number of cells allocated to the uplink bandwidth based on the warning to thereby dynamically control the uplink bandwidth (see, for example, Japanese Patent Laid Open Publication No. 2000-358041).

Problems of the conventional techniques will now be described.

The algorithm D1 in Non-Patent Document 1 is relatively concise and can be easily realized in a small-scale PON. However, there is a problem in scalability. More specifically, the control circuit may be subjected to a great burden when the number of ONUs is large, because the allocation is intensively performed after the REPORTs of all ONUs are collected before the start of the next service cycle.

Therefore, costly and fast integrated circuits or CPUs are necessary in the control circuit of a large-scale PON, resulting in an increased cost of the system. Furthermore, the performance may be degraded if a plenty of calculation time is allowed, because the start of the service cycle is delayed, and the bandwidth is wasted.

In the technique in Japanese Patent Laid Open Publication No. 2000-358041, the OLT intensively controls the bandwidth allocation. Therefore, costly and fast integrated circuits or CPUs are necessary in the control circuit of a large-scale PON, and the cost of the system may be increased.

SUMMARY

The present invention has been made to solve the problems. An exemplary object of the present invention is to provide a bandwidth allocation method, an optical line terminator, an optical network unit, a communication system, and a recording medium recording a program of a device capable of increasing the bandwidth use efficiency without requiring costly and fast integrated circuits or CPUs in the control circuit even in a large-scale system with a large number of ONUs.

To attain the object, the present invention provides a bandwidth allocation method including: an allocating step for an optical network unit to determine bandwidth allocation based on a predetermined allocation condition; a bandwidth transmitting step for the optical network unit to transmit bandwidth allocation information determined in the allocating step to an optical line terminator; and a pipeline transmitting step for the optical line terminator to transmit the bandwidth allocation information transmitted from the optical network unit to all optical network units to be allocated with bandwidth.

The present invention provides an optical network unit including: an allocating unit that determines bandwidth allocation based on a predetermined allocation condition; and a bandwidth transmitting unit that transmits bandwidth allocation information determined by the allocating unit to an optical line terminator.

The present invention provides an optical line terminator connected to a plurality of optical network units, the optical line terminator including a pipeline transmitting unit that transmits bandwidth allocation information transmitted from the optical network unit to all optical network units to be allocated with bandwidth.

The present invention provides a communication system in which the optical network unit according to the present invention is connected to the optical line terminator according to the present invention through an optical splitter.

The present invention provides a recording medium recording a program of an optical network unit, the program causing a computer of the optical network unit to execute: an allocation process of determining bandwidth allocation based on a predetermined allocation condition; and a bandwidth transmission process of transmitting bandwidth allocation information determined in the allocation process to an optical line terminator.

The present invention provides a recording medium recording a program of an optical line terminator connected to a plurality of optical network units, the program causing a computer of the optical line terminator to execute a pipeline transmission process of transmitting bandwidth allocation information transmitted from the optical network unit to all optical network units to be allocated with bandwidth.

BRIEF DESCRIPTION OF THE DRAWINGS

The objects and features of the present invention will become more apparent from the consideration of the following detailed description taken in conjunction with the accompanying drawings, in which.

EXEMPLARY EMBODIMENT

An exemplary embodiment applying a bandwidth allocation method, an optical line terminator, an optical network unit, a communication system, and a recording medium recording a program of a device according to the present invention will now be described in detail with reference to the drawings.

An outline of the present embodiment will be described first.

Figure 1:
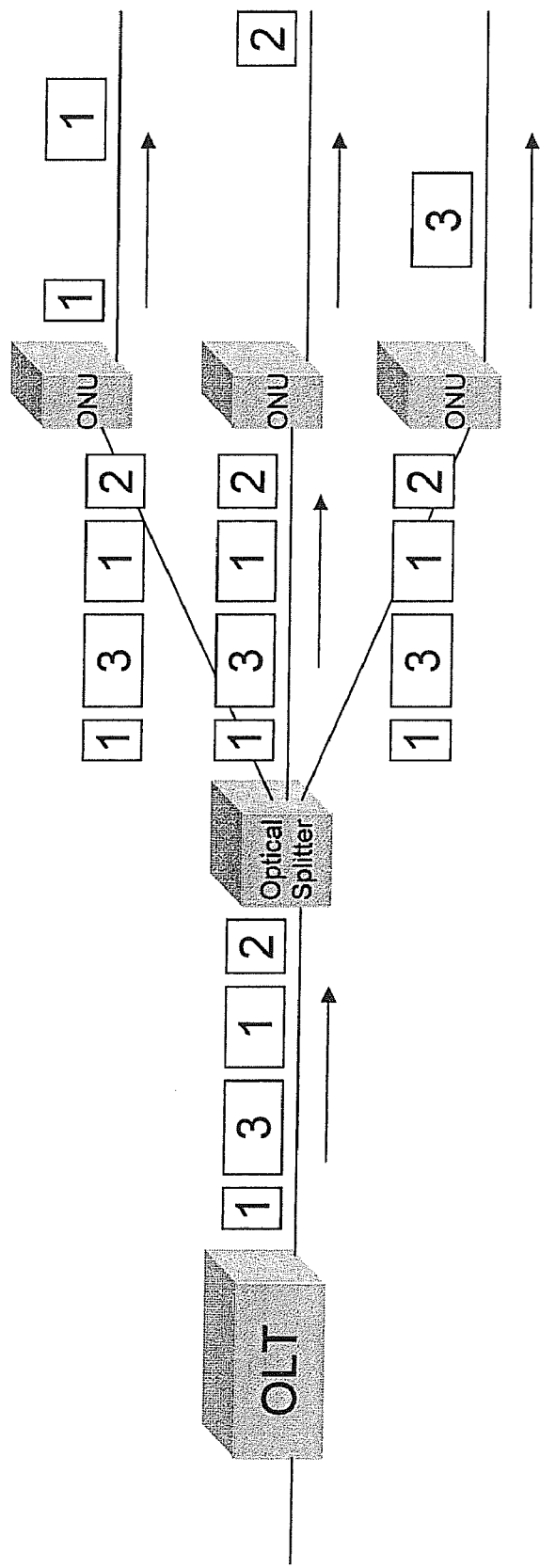
FIG. 1 is a block diagram of a mechanism of a configuration of a general PON and downlink signals.
Figure 2:
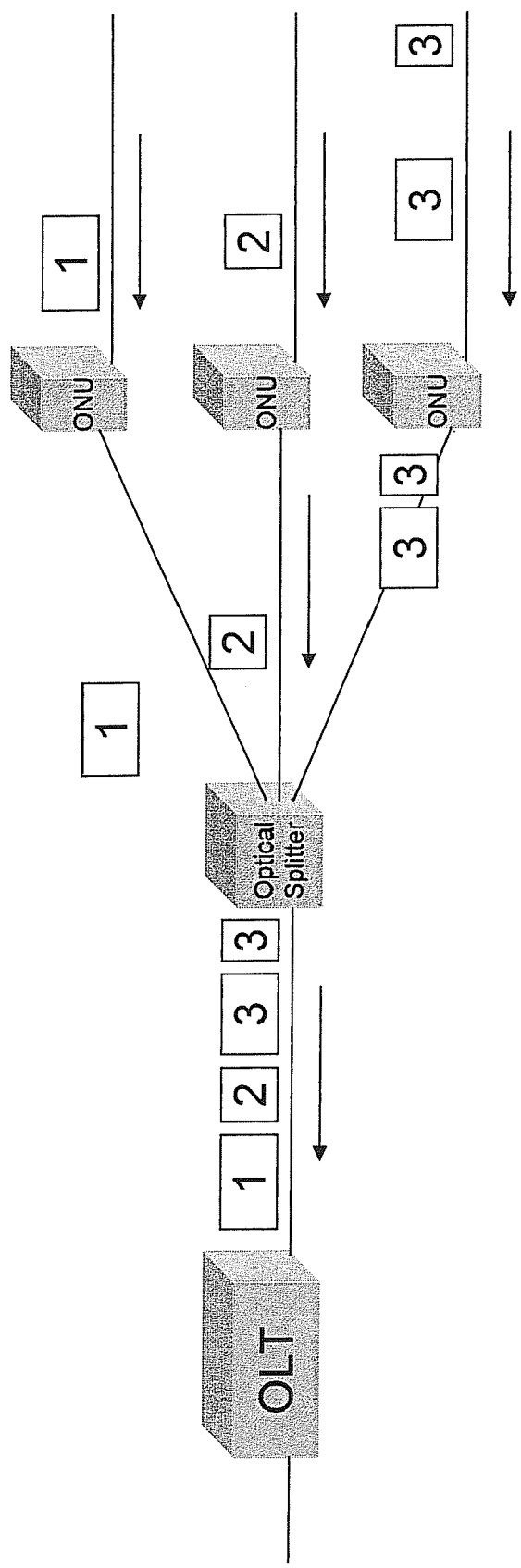
FIG. 2 is a block diagram of a mechanism of a configuration of the general PON and uplink signals.
Figure 3:
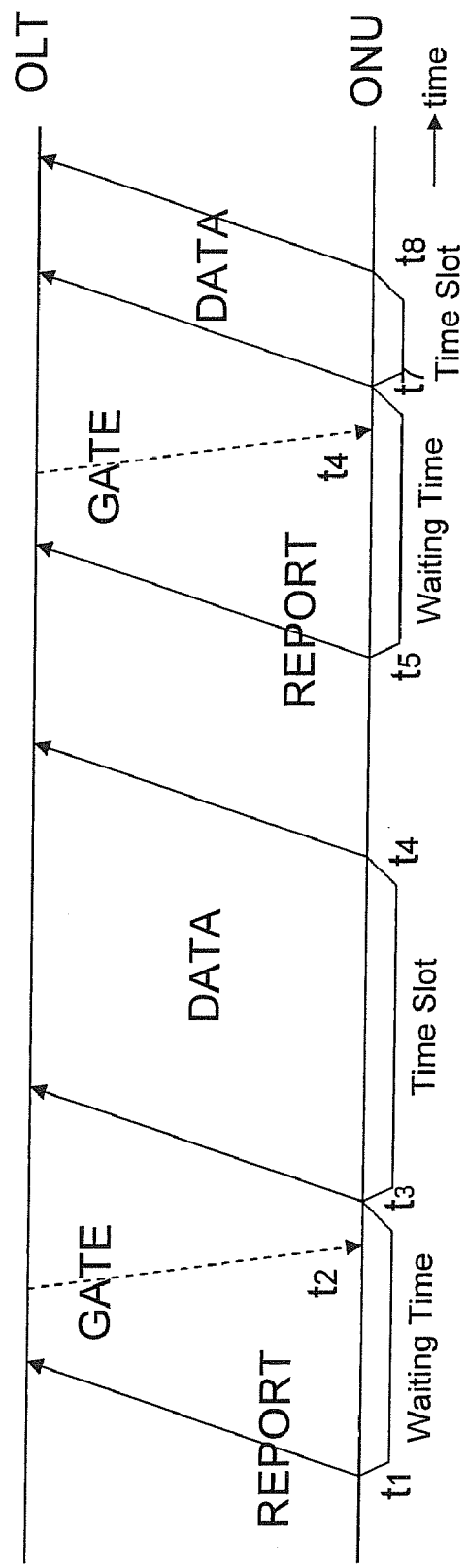
FIG. 3 depicts a time relationship between signals exchanged between general ONU and OLT.
Figure 4:
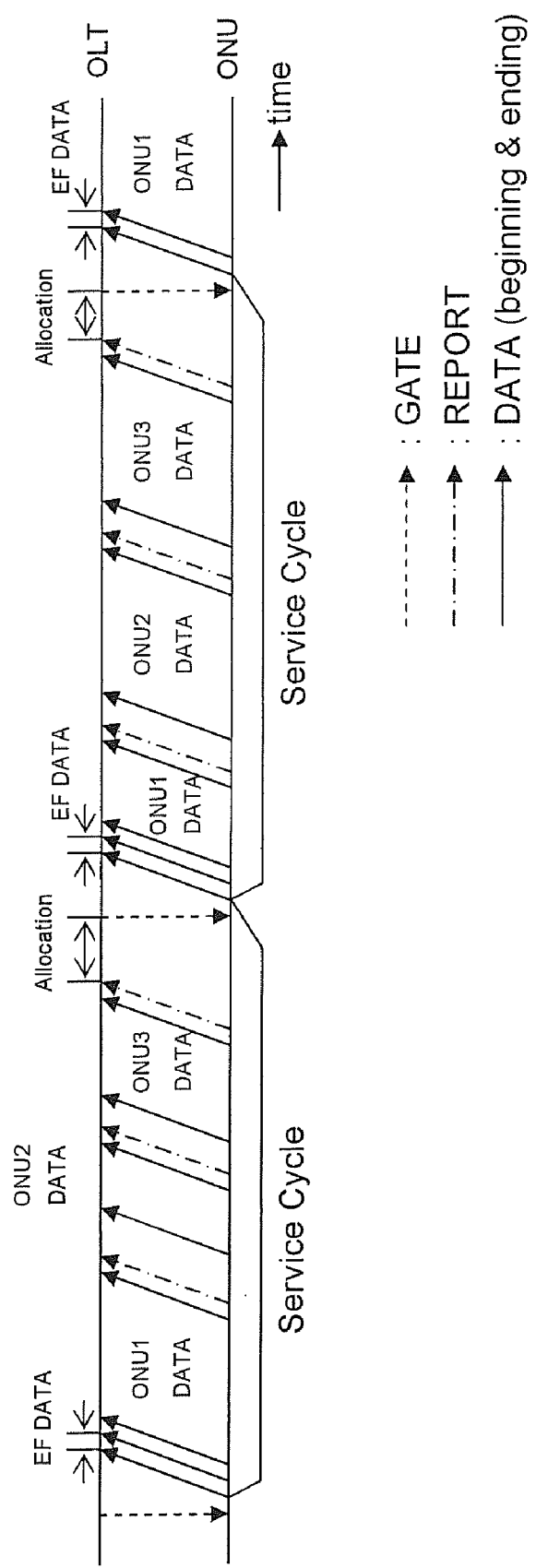
FIG. 4 depicts a time relationship between signals exchanged among three general ONUs and an OLT.
Figure 5:
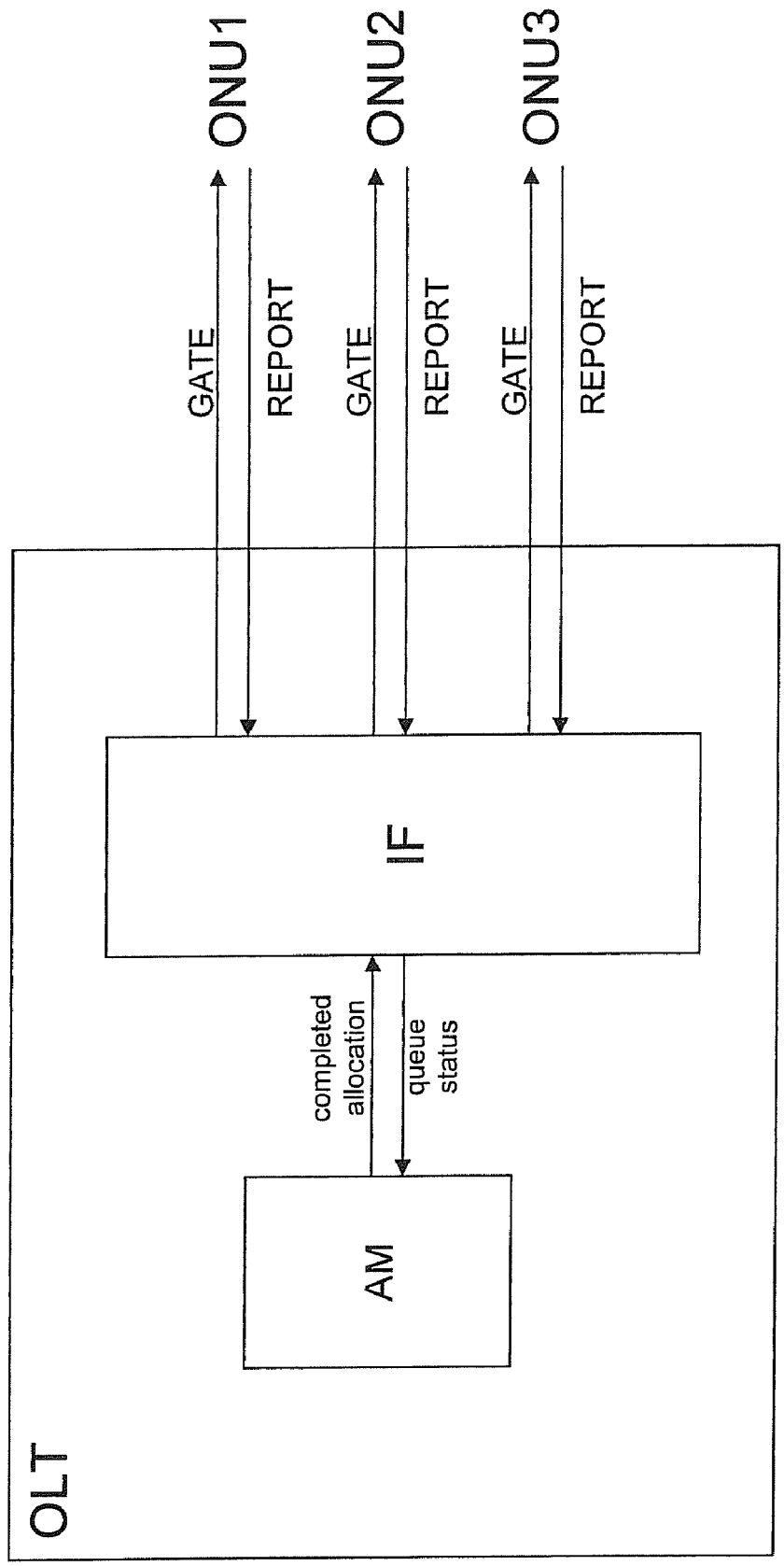
FIG. 5 is a block diagram of an allocation module arranged in an OLT of a related technique.
Figure 6:
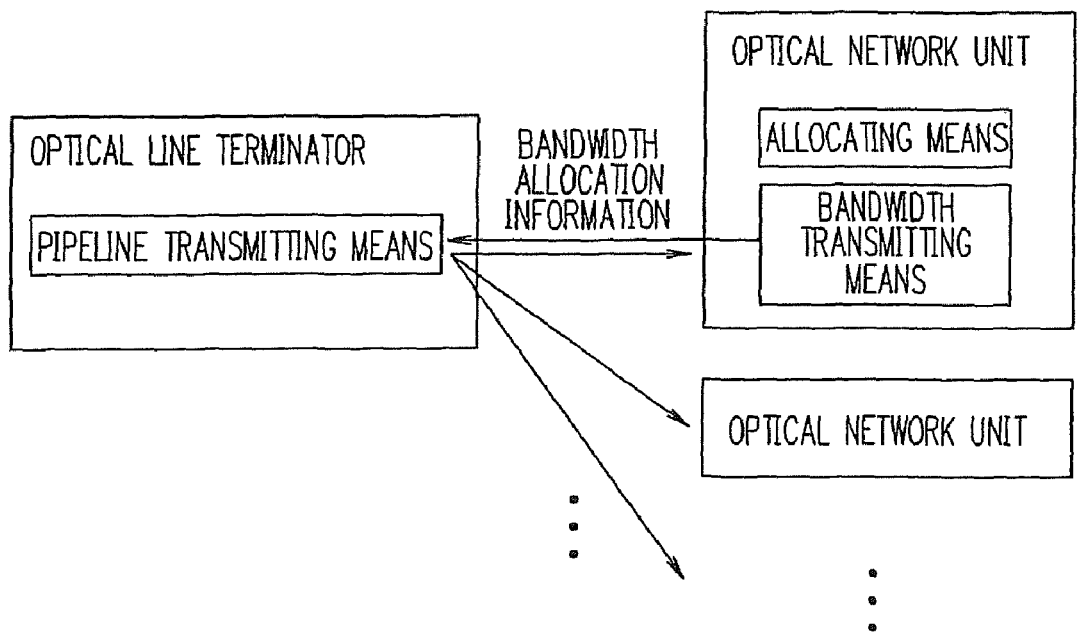
FIG. 6 depicts an outline of exemplary embodiments of the present invention.

In the present embodiment, as shown in FIG. 6, an optical network unit comprises allocating means for determining bandwidth allocation based on a predetermined allocation condition and bandwidth transmitting means for transmitting bandwidth allocation information determined by the allocating means to an optical line terminator.

The optical line terminator comprises pipeline transmitting means for transmitting the bandwidth allocation information transmitted from the connected optical network unit to all optical network units to be allocated with bandwidth.

With such a configuration, the present embodiment disperses and arranges uplink allocation modules of PON in the optical network units and introduces pipeline processing. In this way, the present embodiment provides a bandwidth allocation method in which the processing load of the optical line terminator is reduced, the bandwidth use efficiency is high, and the fairness and scalability are high.

A configuration of the present embodiment will now be described.

General configuration and system of PON are described above as a background art. The present embodiment disperses and arranges allocation modules (AM), which have been concentrated and arranged in an optical line terminator (OLT) in the related technique, in optical network units (ONU1 to ONU3).

Therefore, the allocation results are reported to the OLT with uplink signals in the present embodiment. The OLT comprises an NM (notification module) as a function for notifying an allocation result determined by each ONU to all ONUs.

Figure 7:
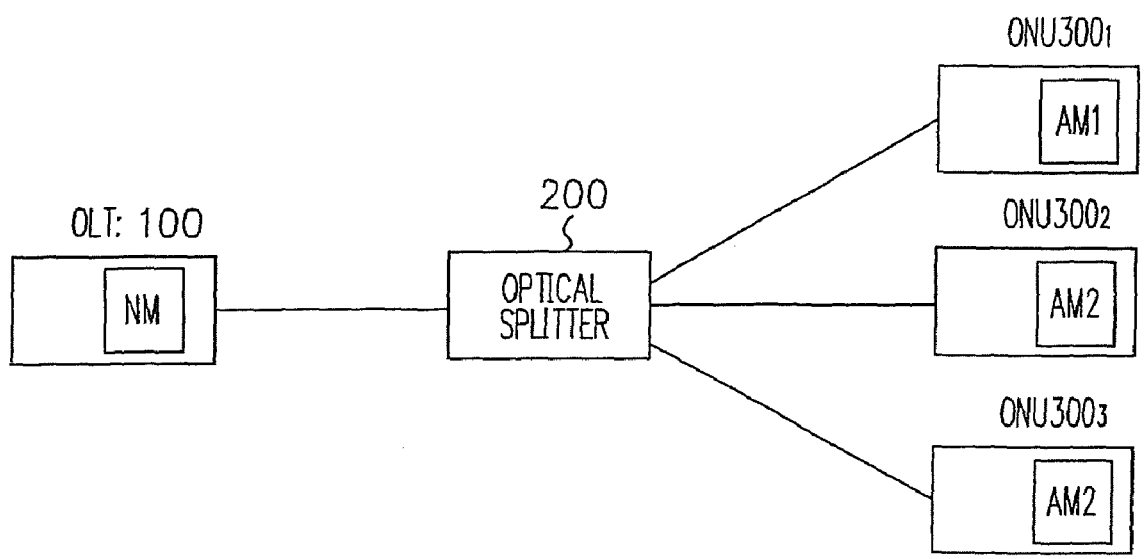
FIG. 7 is a block diagram of a configuration example of a communication system of the present embodiment.

FIG. 7 depicts a configuration example of a communication system of the present embodiment. FIG. 7 depicts a functional arrangement of an example with three optical network units (ONU 300). In the communication system of the present embodiment, the ONUs 300 are connected to an OLT 100 through an optical splitter 200.

Figure 8:
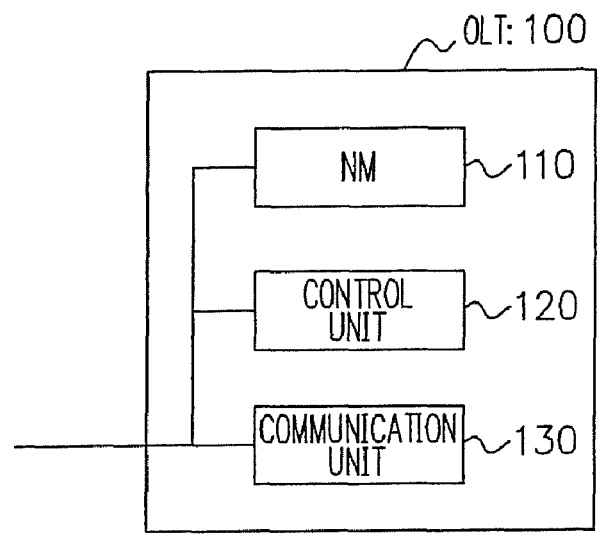
FIG. 8 is a block diagram of a configuration example of an OLT 100.

As shown in FIG. 8, the OLT 100 comprises an NM (pipeline transmitting means) 110 described above, a control unit 120 that performs control of the entire device such as control of communication with the ONUs, and a communication unit 130 that is a communication IF (interface).

Figure 9:
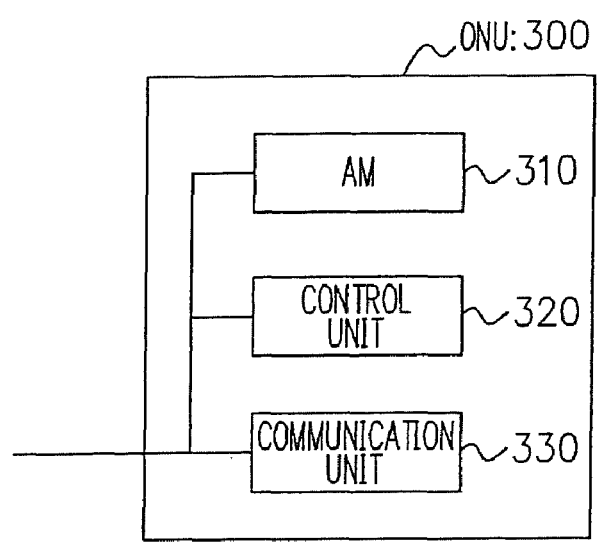
FIG. 9 is a block diagram of a configuration example of an ONU 300.

As shown in FIG. 9, the ONU 300 comprises an AM (allocating means) 310 described above, a control unit 320 that performs control of the entire device such as control of communication with the OLT, and a communication unit 330 that is a communication IF (interface). The bandwidth transmitting means is realized by the control unit 320 and the communication unit 330.

Each allocation module (AM $310_1$ to AM $310_3$) of each ONU 300 includes a function of executing bandwidth allocation of the own ONU based on a buffer queue status (length of queue) of each priority class within the own module and bandwidth allocation results of other ONUs notified from the OLT 100. The bandwidth allocation result transmitted from each ONU 300 includes time of the start of signal of each priority class arriving at the OLT and duration time.

The AM $310_1$, AM $310_2$, and AM $310_3$ are allocation modules including a function of executing bandwidth allocation by pipeline processing based on allocation information of other ONUs notified through the OLT 100. More specifically, each of the AM $310_1$, AM $310_2$, and AM $310_3$ receives a queue status of the ONU $300_1$, ONU $300_2$, and ONU $300_2$ respectively and an allocation result from the module of the previous ONU through the OLT 100 and transmits the allocation result to the module of the next ONU. Each ONU 300 transmits an uplink signal based on completed allocation.

Operations of the present embodiment will now be described.

Figure 10:
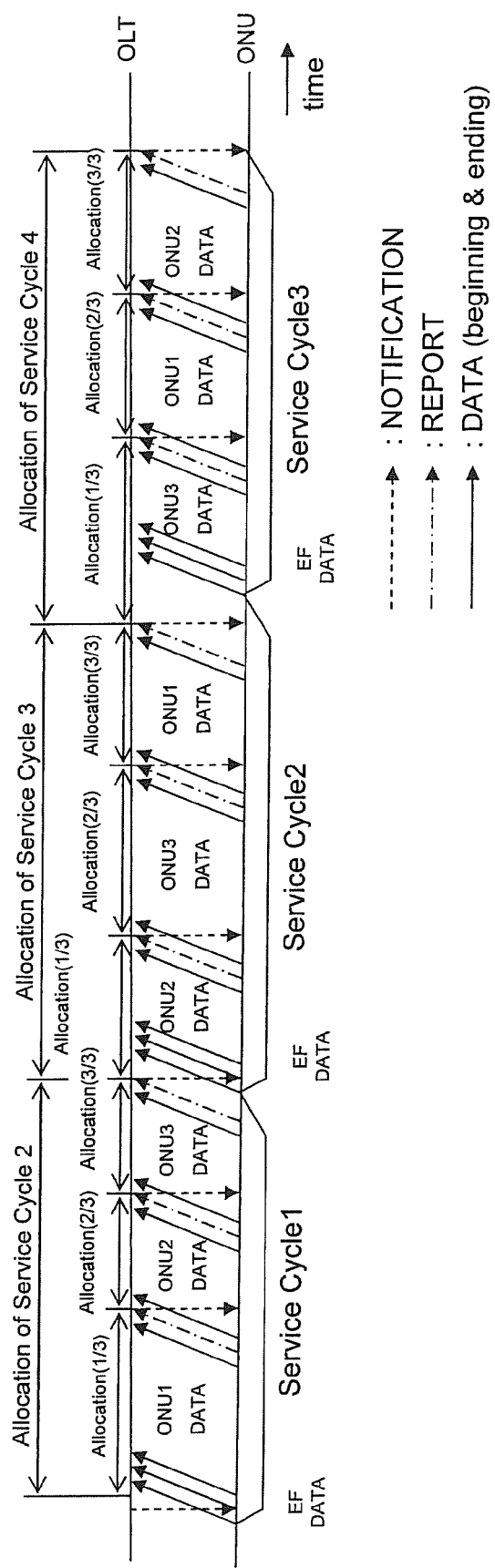
FIG. 10 depicts an operation example of bandwidth allocation in the present embodiment.

A cycle in which data transmissions by all ONUs are performed will be called a service cycle (abbreviated as SC). In the present embodiment, bandwidth allocation of the next SC is performed within the period of the current SC. FIG. 10 depicts an operation of bandwidth allocation in the configuration of FIG. 7. The results of time matching and distance (propagation delay time) measurement performed between the OLT 100 and the ONUs 300 upon system startup are notified to the ONUs and stored in a memory. Therefore, each AM can calculate the arrival time of the start of signal to the OLT 100 in the bandwidth allocation. Each ONU is aware of the unit number of the ONU, i.e. where in the pipeline processing the own ONU is located, by notification from the OLT 100.

In the present embodiment, fixed bandwidth is allocated to the EF classes of the ONUs, and an EF time slot is arranged at the start of each SC. Therefore, the bandwidth allocation is performed to the AF classes and the BE classes. Total maximum bandwidth of SC (Maximum of Service Cycle) is determined in advance to avoid exceeding the maximum upon allocation.

The AM $310_1$ performs allocation in an SC2 related to the ONU $300_1$ based on the own queue status of the AM $310_1$. At this time, the AM $310_1$ performs allocation so that all signals accumulated in the queue of the AM $310_1$ can be transmitted if the signals fall within the range of the Maximum of Service Cycle.

The AM $310_1$ notifies the result to the OLT 100 as a Report 1. The Report 1 includes a signal arrival time to the OLT 100 and a signal duration time. The OLT 100 immediately notifies the result of the Report 1 to all ONUs by a downlink signal. The notification signal will be called a Notification 1. Allocation (1/3) of FIG. 10 shows time of the operation so far.

The AM $310_2$ of the ONU $300_2$ performs allocation in the SC2 related to the ONU $300_2$ based on notification information (allocation result of the ONU $300_1$) from the OLT 100 and the own queue status of the AM $310_2$. The information from the OLT 100 includes time that the start of signal of the ONU $300_1$ arrives at the OLT 100 and duration time of the signal. Therefore, the ONU $300_2$ determines signal transmission start time that can avoid collision with a signal from the ONU $300_1$. At this time, the ONU $300_2$ uses propagation delay time between the OLT 100 and the ONU $300_2$ notified upon startup to calculate the time. The AM $310_2$ takes into account the allocation result of the AM $310_1$ and the priority of class to perform the allocation.

Illustrating the priority with simplified reference characters, the communication system of the present embodiment executes allocation in the order of AF (ONU1)>AF (ONU2) >BE (ONU1)>BE (ONU2). Although AF (ONU1) is not changed as a result, BE (ONU1) may be eroded by AF (ONU2) and reduced. The BE is not allocated if the allocation of AF exceeds the Maximum of Service Cycle.

The AM $310_2$ notifies the allocation result to the OLT 100, and the result is again notified to all ONUs from the OLT 100 by downlink signals. Allocation (2/3) of FIG. 10 shows time of the operation so far.

The AM $310_3$ performs allocation in the SC2 related to the ONU $300_3$ based on the result handed over from the AM $310_2$ through the OLT 100 and the own queue status of the AM $310_3$. In this case, the allocation is performed in the priority order of AF (ONU1)>AF (ONU2)>AF (ONU3)>BE (ONU1) >BE (ONU2)>BE (ONU3).

This completes the allocation in the SC2, and the allocation result is handed over from the AM $310_3$ to the OLT 100 and notified again to all ONUs. Similarly, the allocation in the SC3 is performed in the order of AM $310_2 \rightarrow$ AM $310_3 \rightarrow$ AM $310_1$, and the result is shared by all ONUs. The priority in this case is AF (ONU2)>AF (ONU3)>AF (ONU1)>BE (ONU2) >BE (ONU3)>BE (ONU1).

The allocation in the SC4 is performed in the order of AM $310_3 \rightarrow$ AM $310_1 \rightarrow$ AM $310_2$, and the result is shared by all ONUs. The priority in this case is AF (ONU3)>AF (ONU1) >AF (ONU2)>BE (ONU3)>BE (ONU1)>BE (ONU2).

As the start modules of allocations are sequentially shifted and cyclically changed depending on the SC, the communication system of the present embodiment also cyclically changes the order of data transmissions from the ONUs. More specifically, the data is transmitted in the orders of ONU1→ONU2→ONU3 in the SC2, ONU2→ONU3→ONU1 in the SC3, and ONU3→ONU1→ONU2 in the SC4.

Since the allocation results (REPORT) from the ONUs are piggy backed to the uplink data, the REPORTs from the ONUs arrive at the OLT 100 in the same order as the data. The fairness among the ONUs is maintained by cyclically changing the start modules of allocation.

Figure 11:
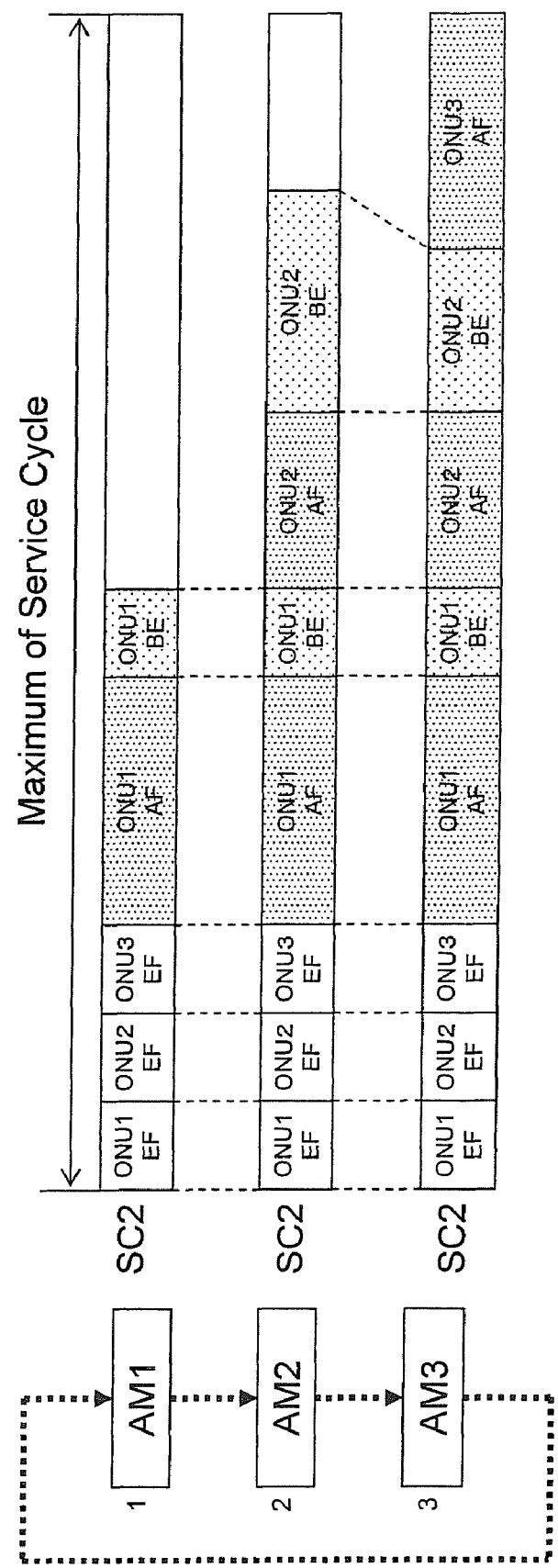
FIG. 11 depicts an example of bandwidth allocation in an SC2 in time series.
Figure 12:
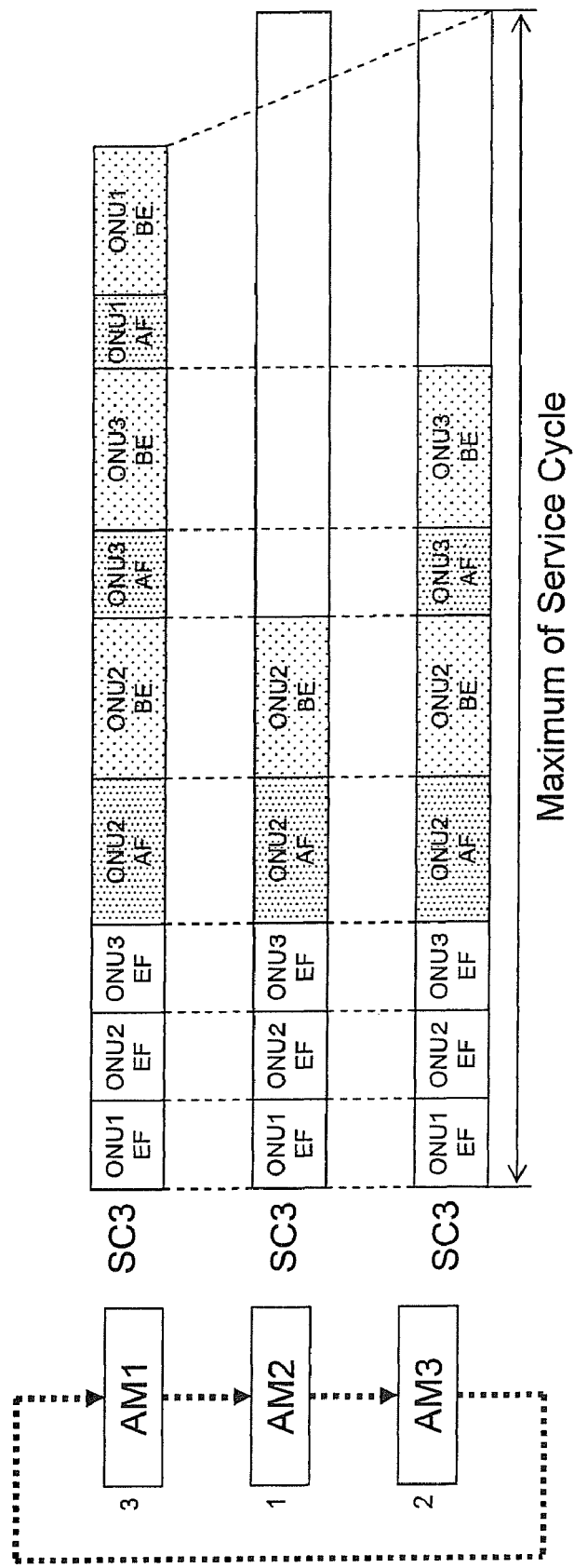
FIG. 12 depicts an example of bandwidth allocation in an SC3 in time series.
Figure 13:
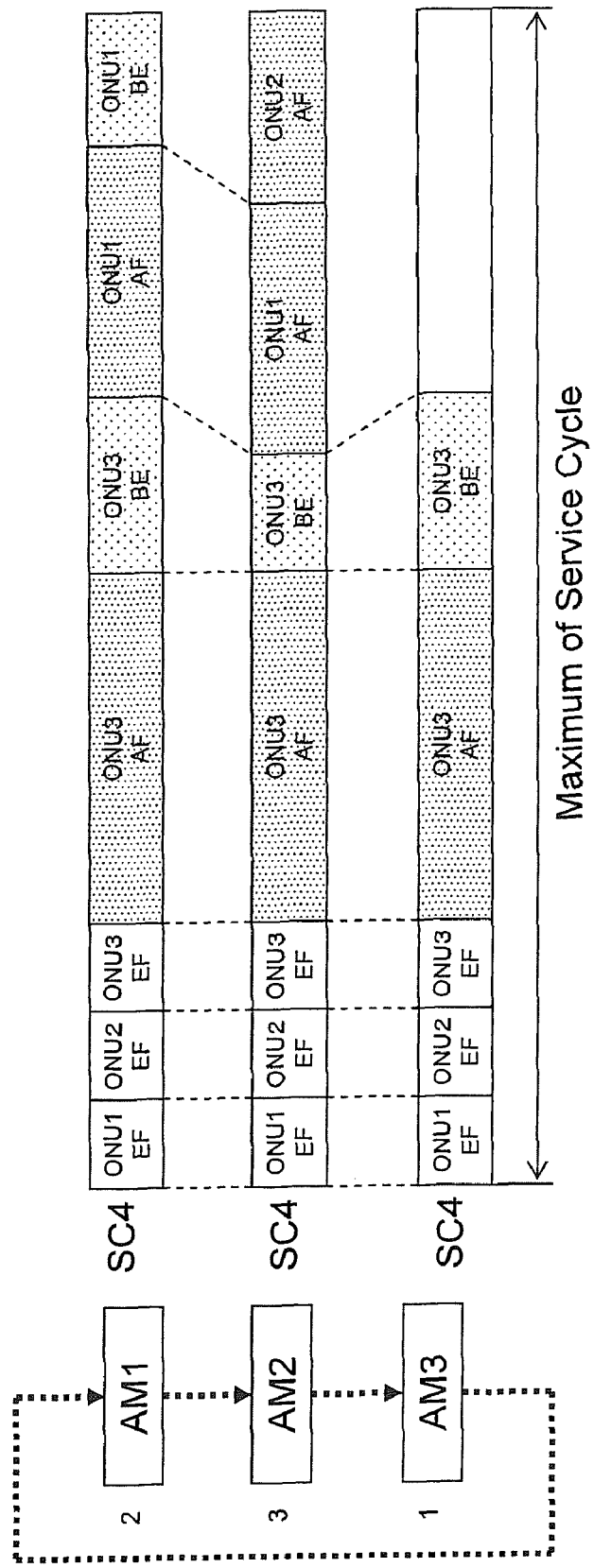
FIG. 13 depicts an example of bandwidth allocation in an SC4 in time series.

FIGS. 11, 12, and 13 depict examples of allocations in the SC2, SC3, and SC4 in time series. In FIGS. 11, 12, 13, the numbers next to the AMs denote orders of allocation. FIG. 11 depicts a situation in which allocation of BE to the ONU $300_2$ that is once performed is removed by AF of the ONU $300_3$.

FIG. 12 depicts an example that all requests are within the Maximum of Service Cycle. FIG. 13 depicts a situation in which AF of the ONU $300_2$ removes all of the BE of the ONU $300_1$ and part of the BE of the ONU $300_3$.

In this way, the AM of the ONU that first determines the bandwidth allocation in the SC determines the bandwidth allocation to transmit the queue to be transmitted in the AM within a transmittable capacity based on the priority information of class when performing the bandwidth allocation in the next SC. The AM then notifies the determined bandwidth allocation information to the OLT 100 as a Report.

The AM of the ONU that is not first in the order for determining the bandwidth allocation in the SC uses the notification information (bandwidth allocation information of the ONU that has performed the previous bandwidth allocation) from the OLT 100 when performing the bandwidth allocation in the next SC, and if the queue to be transmitted in the AM can be allocated within the transmittable capacity, the AM performs the bandwidth allocation in this way.

If the queue to be transmitted in the AM cannot be allocated within the range of the transmittable capacity, the AM of the ONU that is not first in the order for determining the bandwidth allocation in the SC performs the bandwidth allocation to change the bandwidth allocation so that data of a class with higher priority in the queue to be transmitted in the AM is prioritized over allocation data to a class with lower priority in the bandwidth allocation information from the OLT 100.

Figure 14:
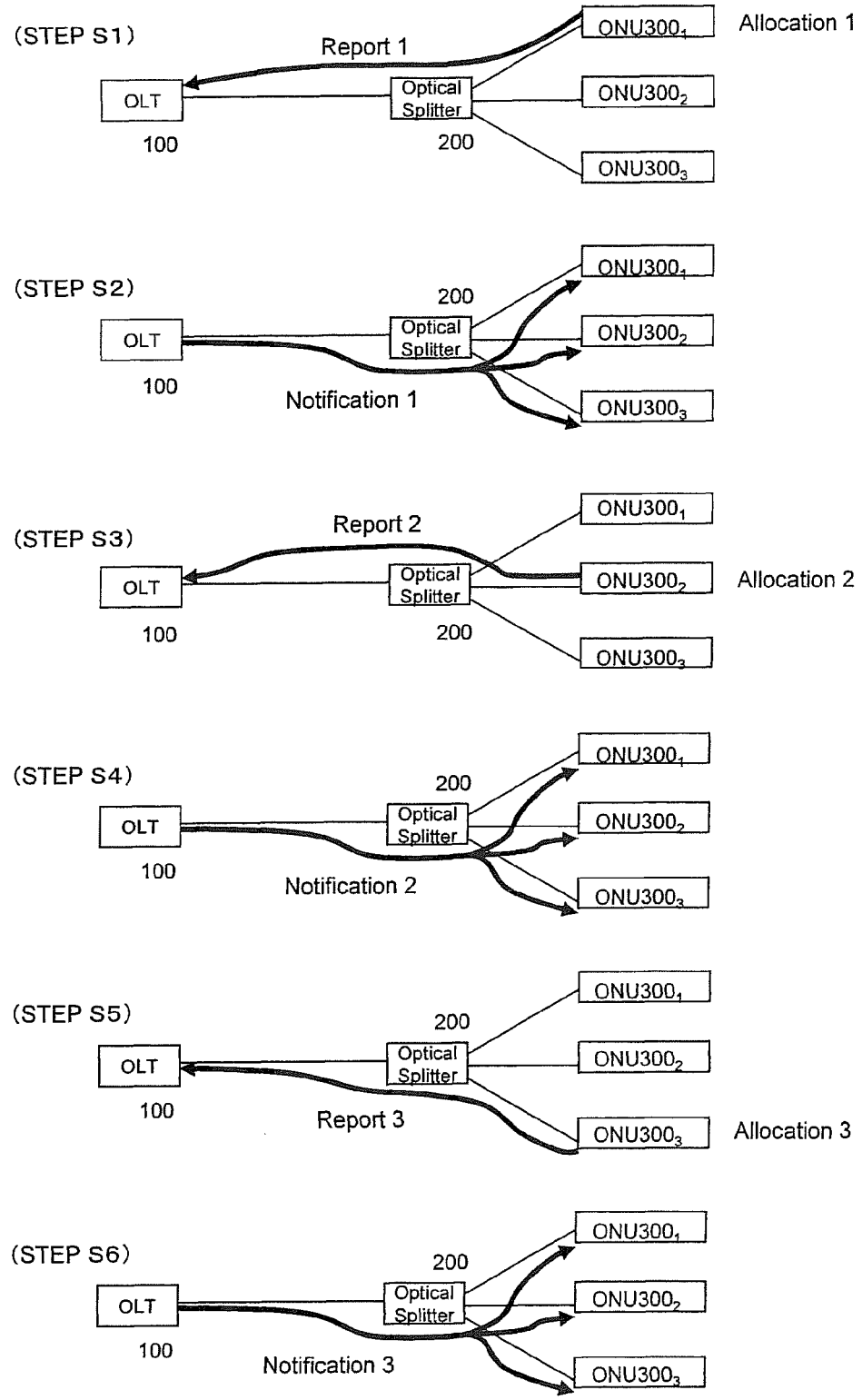
FIG. 14 depicts a procedure of time-series transmission and reception in allocation in an SC2.

FIG. 14 depicts a procedure of time-series transmission and reception of Report and Notification among the OLT 100 and the ONUs in allocation in the SC2. Similarly, FIG. 15 depicts allocation in the SC3, and FIG. 16 depicts allocation in the SC4.

Figure 15:
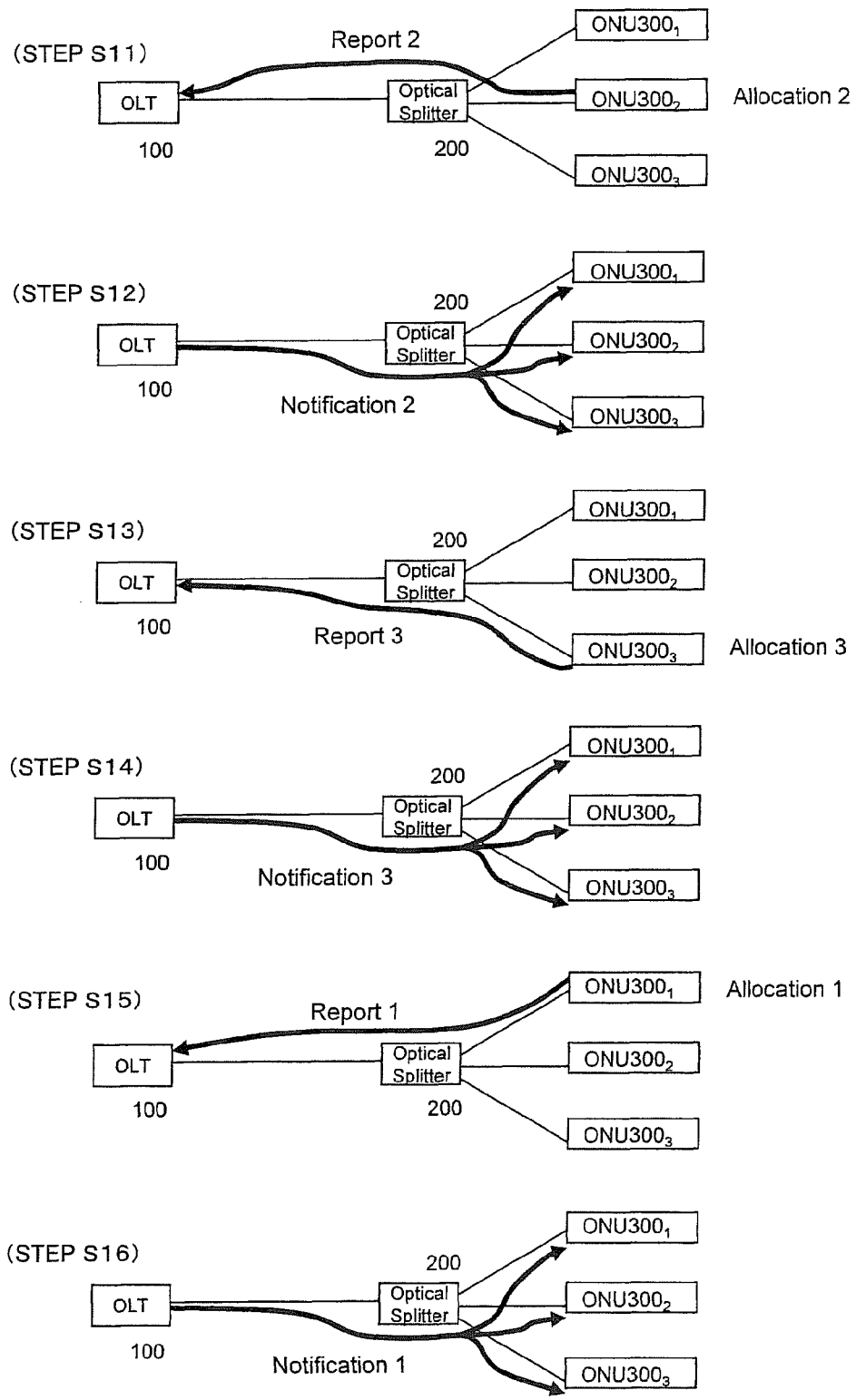
FIG. 15 depicts a procedure of time-series transmission and reception in allocation in an SC3.
Figure 16:
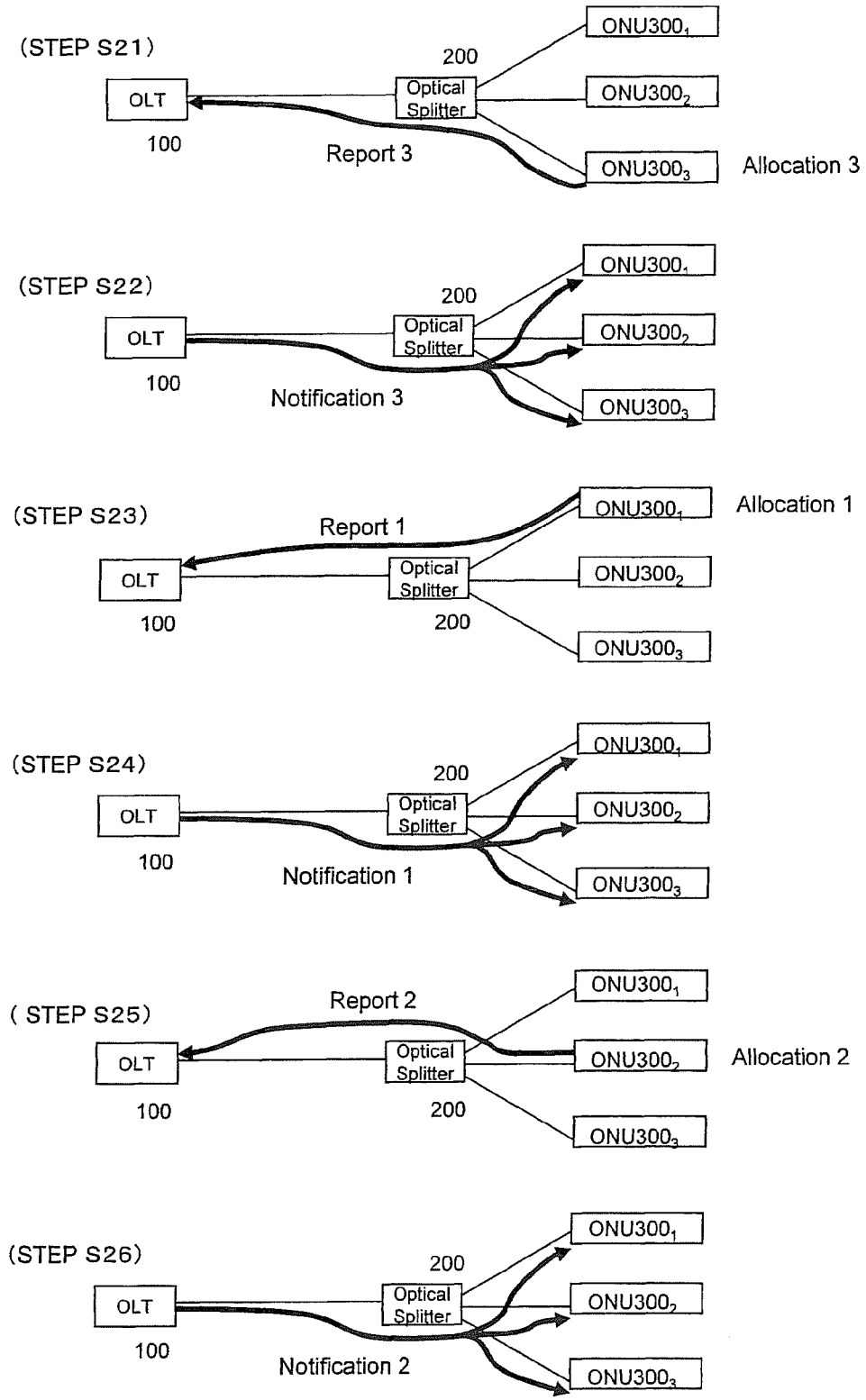
FIG. 16 depicts a procedure of time-series transmission and reception in allocation in an SC4.

As shown in FIGS. 14 to 16, in the communication system of the present embodiment, Report and Notification are transmitted and received, and the transmission order of the signals are cyclically changed in each SC to maintain fairness among the ONUs.

According to the present embodiment, the following advantages can be obtained.

Figure 17:
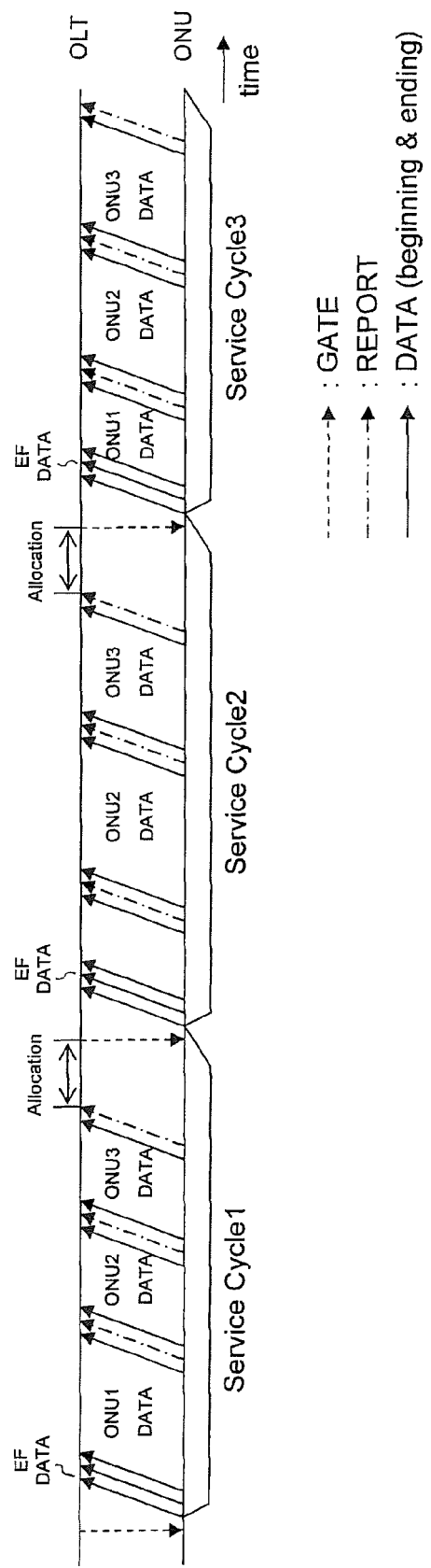
FIG. 17 depicts an operation example of bandwidth allocation in a related art.

Compared to the conventional example that performs allocation after the arrival of the REPORTs from all ONUs, the bandwidth is not wasted in the bandwidth allocation method of the present embodiment because the communication system uses the uplink data reception time to sequentially advance the allocation process. This is apparent by comparing a timing chart of the conventional example in FIG. 17 and timing chart of the present embodiment in FIG. 10.

Moreover, the fairness among the ONUs can be maintained by sequentially shifting and cyclically changing the allocation order of bandwidth in each SC.

Furthermore, a plenty of processing time is allowed by distributed processing in which the AMs of the ONUs participate in the bandwidth allocation. Therefore, the burden of the control unit 120 of the OLT 100 is not significantly increased in the communication system of the present embodiment even if the number of ONUs is increased. As a result, according to the present embodiment, the control unit 120 of the OLT 100 can be configured by inexpensive circuit elements or CPUs, and the cost of the system can be reduced.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

For example, the above embodiments have illustrated an example of allocation to three ONUs. The same allocation method can also be applied even if the number of ONUs is increased to N (N is a natural number) in general. In that case, N AMs are virtually connected in a ring shape to execute the pipeline processing.

Although the above embodiments have illustrated a case in which the data for bandwidth allocation is divided into two classes of AF and BE with predetermined priorities, the data can be further divided. In that case too, the communication system performs allocation according to the rule of class priority order>allocation order.

For example, if AF is divided into AF1>AF2, and BE is divided into BE1>BE2, the communication system performs allocation according to the following rule in a cycle in which the allocation is performed in the order of ONU2→ONU3→ONU1.

AF1 (ONU2)>AF1 (ONU3)>AF1 (ONU1)>AF2 (ONU2) >AF2 (ONU3)>AF2 (ONU1)>BE1 (ONU2)>BE1 (ONU3) >BE1 (ONU1)>BE2 (ONU2)>BE2 (ONU3)>BE2 (ONU1).

In this way, the above embodiments provide, in the uplink bandwidth allocation of PON including N ONUs, a method of executing pipeline processing of bandwidth allocation by N allocation modules mounted on the ONUs.

The above embodiments also provide a method for the ONUs to recognize allocation results of other ONUs through the OLT and a method of cyclically changing the allocation order.

The above embodiments further provide a method of executing the allocation process of the next service cycle by dispersing the process into the current service cycle.

The above embodiments further provide a method of setting a first priority as a priority of M classes, setting a second priority as an allocation order, and performing the allocation according to the first and second priority orders.

Recording the procedure for realizing the communication system, the optical line terminator, and the optical network unit in the embodiments in a recording medium as a program can realize the functions of the embodiments of the present invention by causing a CPU of a computer configuring a system to execute the processes by the program supplied from the recording medium.

In that case, the present invention is applied in the case where an information group including the program is supplied to an output device from the recording medium or an external recording medium through the network. Thus, the program code read out from the recording medium realizes novel functions of the present invention, and the recording medium recording the program code and the signals read out from the recording medium configure the present invention. For example, a flexible disk, a hard disk, an optical disk, a magneto-optical disk, a CD-ROM, a CD-R, a CD-RW, a DVD-ROM, a DVD-RAM, a DVD-RW, a DVD+RW, a magnetic tape, a nonvolatile memory card, or a ROM can be used as the recording medium.

According to the recording medium recording the program of the present invention, the functions in the above embodiments can be realized in the devices controlled by the program.

As described, the present invention can increase the bandwidth use efficiency without requiring costly and fast integrated circuits or CPUs in the control circuit even in a large-scale system with a large number of optical network units.

What is claimed is:

1. A bandwidth allocation method comprising:
an allocating step for an optical network unit to determine bandwidth allocation based on a predetermined allocation condition;
a bandwidth transmitting step for the optical network unit to transmit bandwidth allocation information determined in the allocating step to an optical line terminator; and
a pipeline transmitting step for the optical line terminator to transmit the bandwidth allocation information transmitted from the optical network unit to all optical network units to be allocated with bandwidth, wherein
the optical network unit transmits the bandwidth allocation information along with transmission data in the allocated bandwidth to an optical line terminator,
bandwidth allocation in a next service cycle is determined during a service cycle in which data transmissions by all optical network units to be allocated with bandwidth are performed, and
in the optical network units to be allocated with bandwidth, an order for setting the optical network unit in which the bandwidth allocation is determined in the allocating step is sequentially shifted in each service cycle.

2. A bandwidth allocation method comprising:
an allocating step for an optical network unit to determine bandwidth allocation based on a predetermined allocation condition;
a bandwidth transmitting step for the optical network unit to transmit bandwidth allocation information determined in the allocating step to an optical line terminator; and
a pipeline transmitting step for the optical line terminator to transmit the bandwidth allocation information transmitted from the optical network unit to all optical network units to be allocated with bandwidth, wherein
the optical network unit transmits the bandwidth allocation information along with transmission data in the allocated bandwidth to an optical line terminator,
bandwidth allocation in a next service cycle is determined during a service cycle in which data transmissions by all optical network units to be allocated with bandwidth are performed,
data to be transmitted and received is divided into a plurality of classes with predetermined priorities,
the allocation condition includes priority information of the classes, and
the optical network unit not first in the order for determining the bandwidth allocation in the service cycle in the allocating step uses, in the allocating step, the bandwidth allocation information transmitted in the pipeline transmitting step to
perform the allocation if the queue to be transmitted in the optical network unit can be allocated within the range of the transmittable capacity and
change the bandwidth allocation so that data of a class with higher priority in the queue to be transmitted is prioritized over allocation data to a class with lower priority in the bandwidth allocation information transmitted in the pipeline transmitting step if the allocation of the queue to be transmitted in the optical network unit is impossible within the range of the transmittable capacity.

3. An optical network unit comprising:
an allocating unit that allocates bandwidth allocation based on a predetermined allocation condition; and
a bandwidth transmitting unit that transmits bandwidth allocation information determined by the allocating unit to an optical line terminator, wherein
the bandwidth transmitting unit transmits the bandwidth allocation information to an optical line terminator when data is transmitted in the allocated bandwidth,
bandwidth allocation in a next service cycle in a communication system is determined during a service cycle in which data transmissions by all optical network units to be allocated with bandwidth in the communication system connected with the optical network unit are performed, and
in the optical network units to be allocated with bandwidth in the communication system, an order for setting the optical network unit in which the bandwidth allocation is determined by the allocating unit is sequentially shifted in each service cycle.

4. An optical network unit comprising:
an allocating unit that allocates bandwidth allocation based on a predetermined allocation condition; and
a bandwidth transmitting unit that transmits bandwidth allocation information determined by the allocating unit to an optical line terminator, wherein
the bandwidth transmitting unit transmits the bandwidth allocation information to an optical line terminator when data is transmitted in the allocated bandwidth,
bandwidth allocation in a next service cycle in a communication system is determined during a service cycle in which data transmissions by all optical network units to be allocated with bandwidth in the communication system connected with the optical network unit are performed,
data to be transmitted and received is divided into a plurality of classes with predetermined priorities,
the allocation condition includes priority information of the classes, and
when the optical network unit is not the optical network unit in which the bandwidth allocation is determined first in the service cycle, the allocating unit uses the bandwidth allocation information transmitted from the optical line terminator to
perform the allocation if the queue to be transmitted in the optical network unit can be allocated within the range of the transmittable capacity and
change the bandwidth allocation so that data of a class with higher priority in the queue to be transmitted is prioritized over allocation data to a class with lower priority in the bandwidth allocation information transmitted from the optical line terminator if the allocation of the queue to be transmitted in the optical network unit is impossible within the range of the transmittable capacity.

5. A non-transitory recording medium recording a program of an optical network unit, the program causing a computer of the optical network to execute:
an allocation process of determining bandwidth allocation based on a predetermined allocation condition; and a bandwidth transmission process of transmitting bandwidth allocation information determined in the allocation process to an optical line terminator, wherein in the bandwidth transmission process, the bandwidth allocation information is transmitted to an optical line terminator when data is transmitted in the allocated bandwidth, and bandwidth allocation in a next service cycle in a communication system is determined during a service cycle in which data transmissions by all optical network units to be allocated with bandwidth in the communication system connected with the optical network unit are performed, and in the optical network units to be allocated with bandwidth in the communication system, an order for setting the optical network unit in which the bandwidth allocation is determined in the allocating process is sequentially shifted in each service cycle.

6. A non-transitory recording medium recording a program of an optical network unit, the program causing a computer of the optical network to execute:

an allocation process of determining bandwidth allocation based on a predetermined allocation condition; and a bandwidth transmission process of transmitting bandwidth allocation information determined in the allocation process to an optical line terminator, wherein in the bandwidth transmission process, the bandwidth allocation information is transmitted to an optical line terminator when data is transmitted in the allocated bandwidth, and bandwidth allocation in a next service cycle in a communication system is determined during a service cycle in which data transmissions by all optical network units to be allocated with bandwidth in the communication system connected with the optical network unit are performed, data to be transmitted and received is divided into a plurality of classes with predetermined priorities, the allocation condition includes priority information of the classes, and in the allocation process, when the optical network unit is not the optical network unit in which the bandwidth allocation is determined first in the service cycle, bandwidth allocation information transmitted from the optical line terminator is used to perform the allocation if the queue to be transmitted in the optical network unit can be allocated within the range of a transmittable capacity and change the bandwidth allocation so that data of a class with higher priority in the queue to be transmitted is prioritized over allocation data to a class with lower priority in the bandwidth allocation information transmitted from the optical line terminator if the allocation of the queue to be transmitted in the optical network unit is impossible within the range of the transmittable capacity.

\* \* \* \* \*